(12) United States Patent
Arian et al.

(10) Patent No.: US 7,997,380 B2
(45) Date of Patent: Aug. 16, 2011

(54) LOW FREQUENCY ACOUSTIC ATTENUATOR

(75) Inventors: Abbas Arian, Houston, TX (US); Gary L. Fickert, Houston, TX (US); Joakim O. Blanch, Houston, TX (US); Vimal V. Shah, Sugarland, TX (US); Eugene Linyaev, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 614 days.

(21) Appl. No.: 10/873,087

(22) Filed: Jun. 22, 2004

(65) Prior Publication Data

US 2005/0279565 A1 Dec. 22, 2005

(51) Int. Cl.
*G01V 1/40* (2006.01)

(52) U.S. Cl. .......................... 181/102; 181/106

(58) Field of Classification Search ................ 181/102, 181/105, 106, 111, 112, 119, 121, 122; 367/35, 367/165, 188
See application file for complete search history.

(56) References Cited

U.S. PATENT DOCUMENTS

| | | | | |
|---|---|---|---|---|
| 3,144,090 A * | 8/1964 | Mazzagatti et. al. | ......... | 367/155 |
| 4,020,452 A * | 4/1977 | Trouiller et al. | ............. | 181/102 |
| 4,027,282 A | 5/1977 | Jeter | ............... | 340/18 |
| 4,282,588 A | 8/1981 | Chanson et al. | ................ | 367/82 |
| 4,314,365 A | 2/1982 | Petersen et al. | ................ | 367/82 |
| 4,872,526 A * | 10/1989 | Wignall et al. | ............... | 181/102 |
| 4,992,997 A | 2/1991 | Bseisu | ............ | 367/82 |
| 5,189,642 A * | 2/1993 | Donoho et al. | ................ | 367/15 |
| 5,387,767 A | 2/1995 | Aron et al. | ...................... | 367/25 |
| 5,644,186 A | 7/1997 | Birchak et al. | ................ | 310/337 |
| 5,675,325 A | 10/1997 | Taniguchi et al. | .......... | 340/854.4 |
| 5,798,488 A | 8/1998 | Beresford et al. | ............ | 181/102 |
| 6,213,250 B1 * | 4/2001 | Wisniewski et al. | .......... | 181/104 |
| 6,466,513 B1 | 10/2002 | Pabon et al. | ..................... | 367/35 |
| 6,564,899 B1 * | 5/2003 | Arian et al. | ................... | 181/102 |
| 6,588,267 B1 * | 7/2003 | Bradley | ..................... | 73/152.47 |
| 6,615,949 B1 * | 9/2003 | Egerev et al. | ................ | 181/102 |
| 6,643,221 B1 * | 11/2003 | Hsu et al. | ...................... | 367/162 |
| 2003/0106739 A1 * | 6/2003 | Arian et al. | ..................... | 181/110 |
| 2003/0151977 A1 * | 8/2003 | Shah et al. | ...................... | 367/82 |

FOREIGN PATENT DOCUMENTS

| | | |
|---|---|---|
| EP | 0 552 833 A1 | 1/1993 |
| EP | 0 994 237 A2 | 4/2000 |
| EP | 1 193 368 A2 | 4/2002 |

OTHER PUBLICATIONS

International Search Report (PCT US/2005/18565) Aug. 16, 2006.

* cited by examiner

*Primary Examiner* — Jeremy Luks

(74) *Attorney, Agent, or Firm* — Baker Botts L.L.P.

(57) ABSTRACT

An attenuation apparatus, system, and method are disclosed. The attenuator is attached to a pipe and includes a housing that includes an inner sleeve and an outer sleeve. The attenuator includes one or more masses, to resonate when exposed to waves including acoustic frequency components.

58 Claims, 6 Drawing Sheets

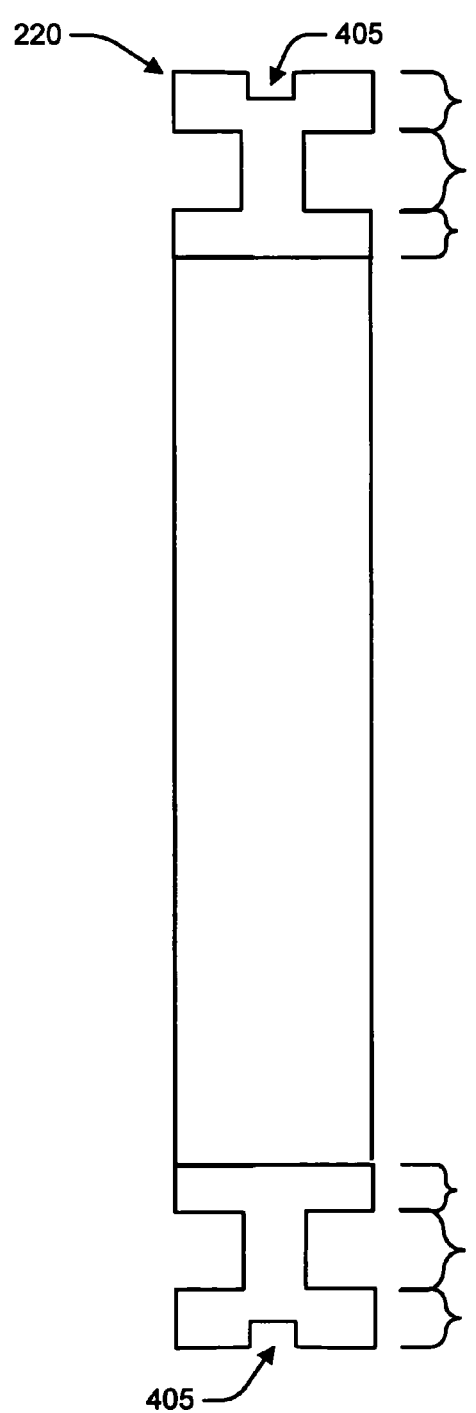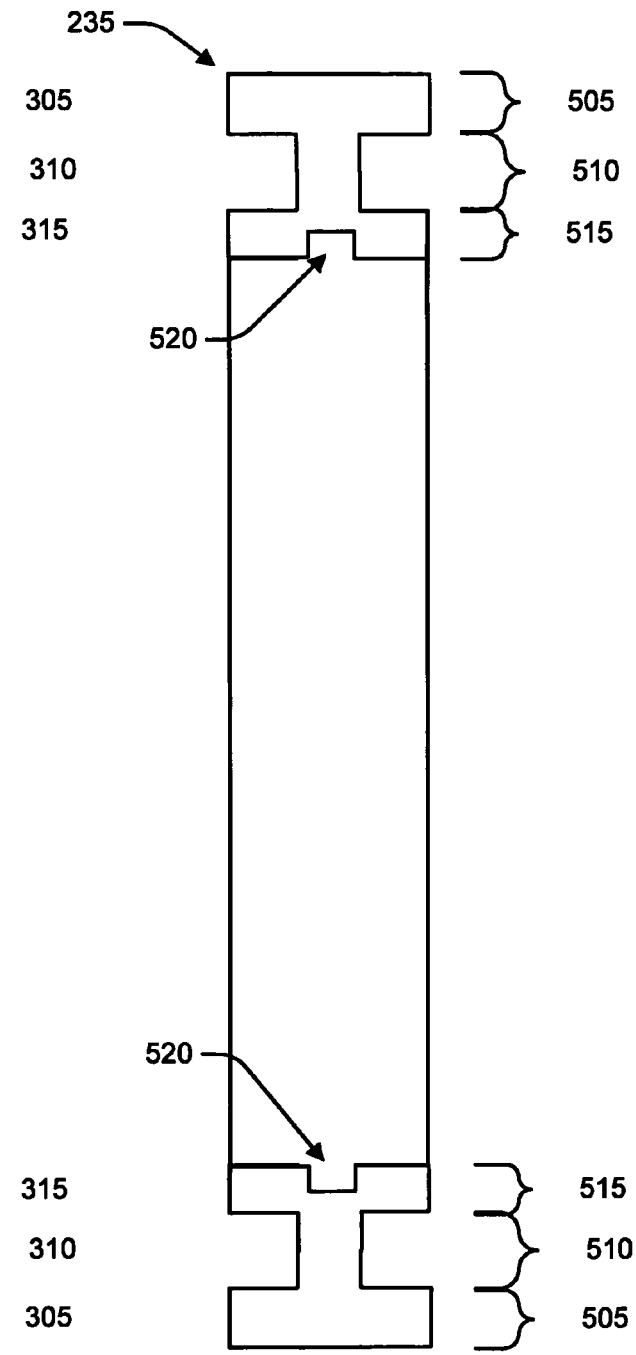
FIG. 4   FIG. 5

LOW FREQUENCY ACOUSTIC ATTENUATOR

BACKGROUND

As oil well drilling becomes increasingly complex, the importance of collecting downhole data while drilling increases.

BRIEF DESCRIPTION OF THE DRAWINGS

FIGS. 3-5 illustrate a ring mass with a resonant frequency.

DETAILED DESCRIPTION

Figure 1:
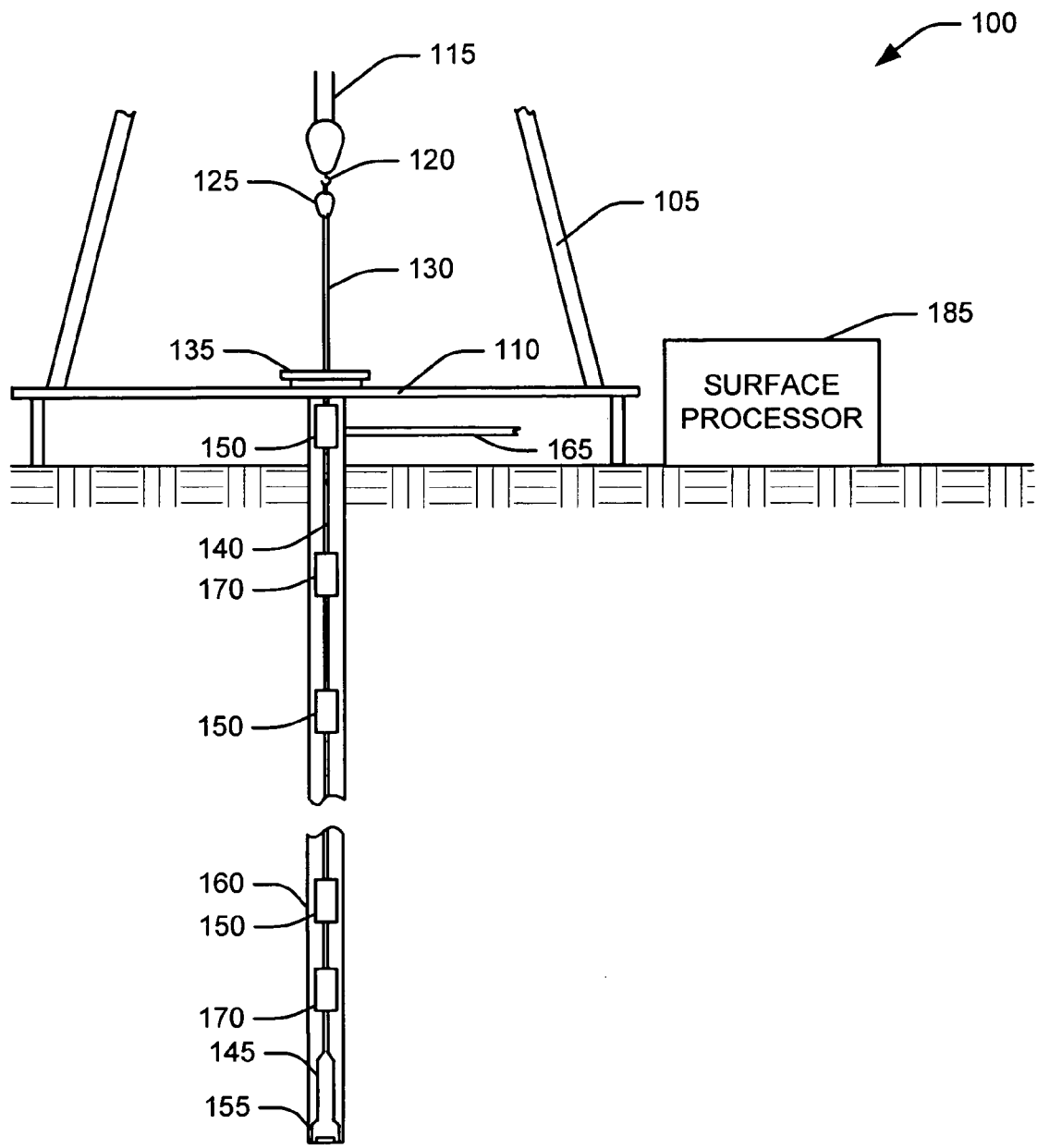
FIG. 1 shows a system for acoustic signaling.

As shown in FIG. 1, oil well drilling equipment 100 (simplified for ease of understanding) includes a derrick 105, derrick floor 110, draw works 115 (schematically represented by the drilling line and the traveling block), hook 120, swivel 125, kelly joint 130, rotary table 135, drillpipe 140, drill collar 145, LWD/MWD tools 150 and 170, and drill bit 155. Drilling fluid, such as mud, foam, or air, is injected into the swivel by a drilling fluid supply line (not shown). The drilling fluid travels through the kelly joint 130, drillpipe 140, drill collars 145, and LWD/MWD tools 150 and 170, and exits through jets or nozzles in the drill bit 155. The drilling fluid then flows up the annulus between the drill pipe 140 and the wall of the borehole 160. A drilling fluid return line 165 returns drilling fluid from the borehole 160 and circulates it to a drilling fluid pit (not shown) and back to the drilling fluid supply line (not shown). The combination of the drill collar 145 and drill bit 155 is known as the bottomhole assembly (or "BHA"). The combination of the BHA and the drillpipe 140 is known as the drillstring. In rotary drilling the rotary table 135 may provide rotation to the drill string, or alternatively the drill string may be rotated via a top drive assembly. The term "couple" or "couples" used herein is intended to mean either an indirect or direct connection. Thus, if a first device couples to a second device, that connection may be through a direct connection, or through one or more intermediate devices.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface.

Logging-while-drilling (LWD) or measurement-while-drilling (MWD) tools 150 are distributed along the drillpipe 140. The LWD/MWD tools 150 may include one or more sensors to detect or measure one or more properties and produce a corresponding sensor signal. The LWD/MWD tools 170 may also include a transmitter to transmit or a receiver to receive sensor signals from other LWD/MWD tools 170. Some of the transmitter in the LWD/MWD tools 150 transmit acoustic signals. The acoustic signals have primary (e.g. no harmonic) frequency components between 100 Hz and 2000 KHz. Some of the transmitters may only produce signals with primary frequency components between 400 Hz and 1.8 KHz. The acoustic signals propagate along the drillpipe 140 between the transmitter and receiver. The signals may also be relayed to a surface processor 185 for analysis.

In addition to transmitters within the LWD/MWD tools 150, acoustic energy is generated by portions of the oil well drilling equipment 100, including, for example, the top-drive assembly or the drill bit 155. One or more attenuator LWD/MWD tools 170 may be placed on the drillstring to attenuate acoustic noise propagating along the drillstring.

Figure 2:
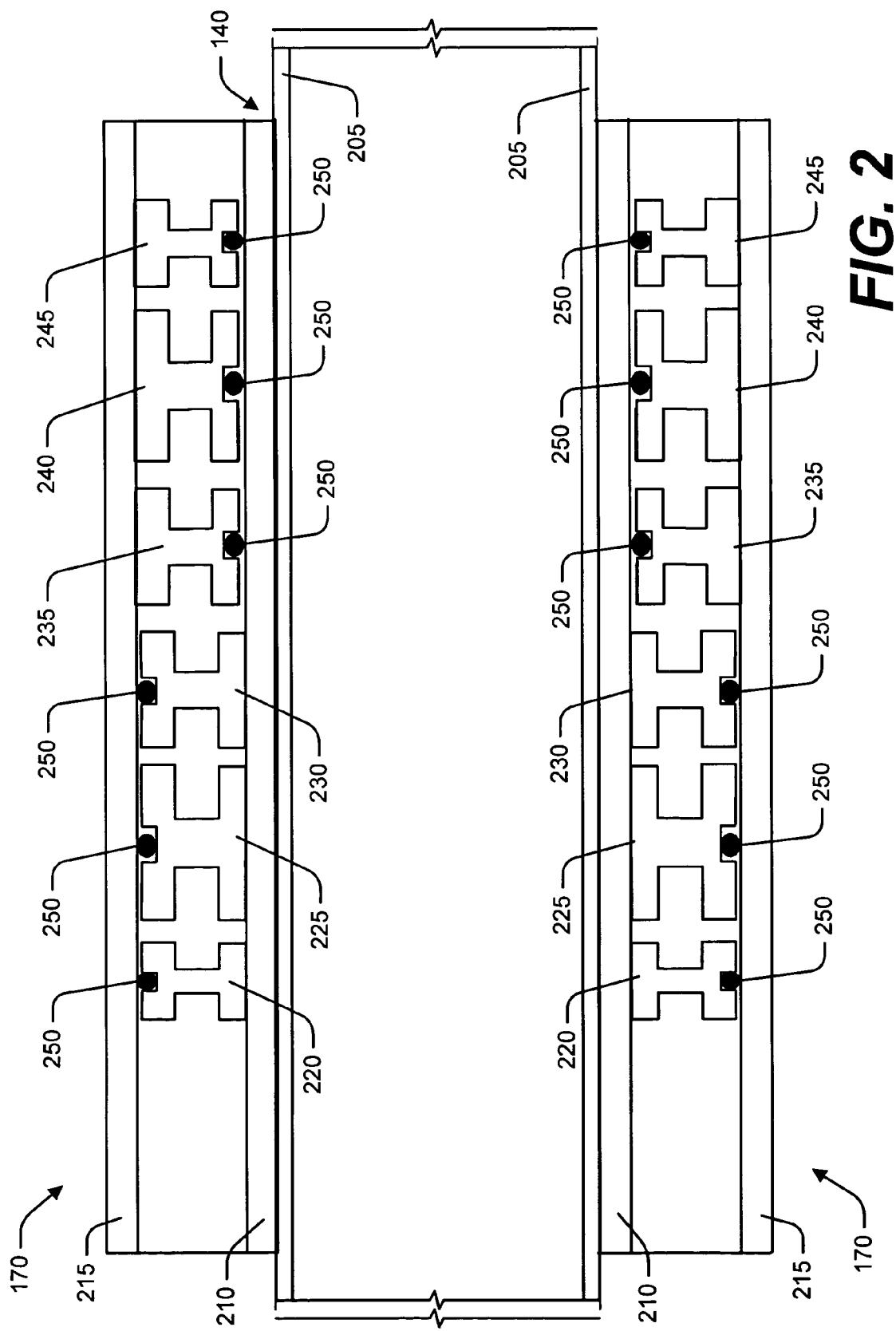
FIG. 2 illustrates a portion of the drillstring with an acoustic attenuator attached.

A cut-away view of an acoustic attenuator 170 mounted to a portion of the drillpipe 140 as shown in FIG. 2. In other implementations the acoustic attenuator 170 is mounted in or about the drill collar 145 or another portion of the drillstring. The acoustic attenuator 170 includes a housing that includes an inner sleeve 210 and an outer sleeve 215. The acoustic attenuator 170 may be a hollow drill collar. The inner sleeve 210 of the acoustic attenuator 170 is formed to acoustically and mechanically engage a wall 205 of the drillpipe 140, or other portion of the drillstring. The drillstring or the inner collar 210 may include features, including, for example, threading, to form a mechanical and acoustic engagement between the drillpipe 140 and the inner collar 210. The acoustic attenuator 170 includes one or more masses such as masses 220, 225, 230, 235, 240, and 245.

In certain implementations, the inner sleeve 210 may perform the functions of the wall 205. In these implementations, the wall 205 may be omitted, in part, and replaced by the inner sleeve 210.

One example acoustic attenuator 170 has a length that is less than one wavelength of the shortest frequency that the acoustic attenuator 170 is designed to attenuate. Such a configuration may prevent the acoustic attenuator 170 from becoming a resonator at a frequency that it is designed to attenuate. Another example acoustic attenuator 170 has a length that is greater than one wavelength of the longest frequency that the acoustic attenuator 170 is designed to attenuate.

One or more of the masses, such as masses 220, 225, and 230, are affixed to the inner collar 210. The masses 220, 225, and 230 are in mechanical and acoustic contact with the inner sleeve 210. The masses 220, 225, and 230 may be in intimate contact with the inner sleeve 210. For example, the masses may be welded to the inner collar 210 or the inner collar 210. There is a gap between the masses 220, 225, and 230 and the outer sleeve 215. Rubber O-rings 250 may be placed between the masses 220, 225, and 230 and the outer sleeve 215. The O-rings 250 may prevent the masses 220, 225, and 230 from contacting the outer sleeve 215 and may dampen vibrations in the masses 220, 225, and 230.

One or more of the masses, such as masses 235, 240, and 245 and affixed to the outer collar 215. The masses 235, 240, and 245, are in mechanical and acoustic contact with the outer sleeve. The masses 235, 240, and 245 may be in intimate contact with the outer sleeve. For example, the masses may be welded to the inner collar 210 or the outer collar 215. Rubber O-rings 250 may be placed between the masses 235, 240, and 245 and the inner sleeve 210. The O-rings 250 may prevent the masses 235, 240, and 245 from contacting the inner sleeve 210 and may dampen vibrations in the masses 235, 240, and 245.

The inner collar 210 and outer collar 215 may include features, such as threading, to engage the masses. The masses may also be expandable, in response to compressive forces, to engage the inner sleeve 210 or the outer sleeve 215. The inner collar 210, outer collar 215, and each of the masses experience expansion when applied to heat. The masses may have greater expansion when applied to heat than the outer sleeve 215 and a lesser expansion than the inner sleeve 210. In such a configuration, the masses may maintain contact with one of the sleeves under operating conditions (e.g. downhole during drilling operations).

The masses may have various sizes, shapes, and material compositions to resonate at different ranges of frequencies. Masses with different resonant frequencies are included in the acoustic attenuator 140 to provide a greater range of attenuated frequencies. The attenuator 170 may includes a variety of masses, such that the attenuator, as a whole, will have a frequency response from about 500 Hz to 5 kHz, 100 Hz to 2 KHz, or 400 to 1.8 KHz.

Figure 3:
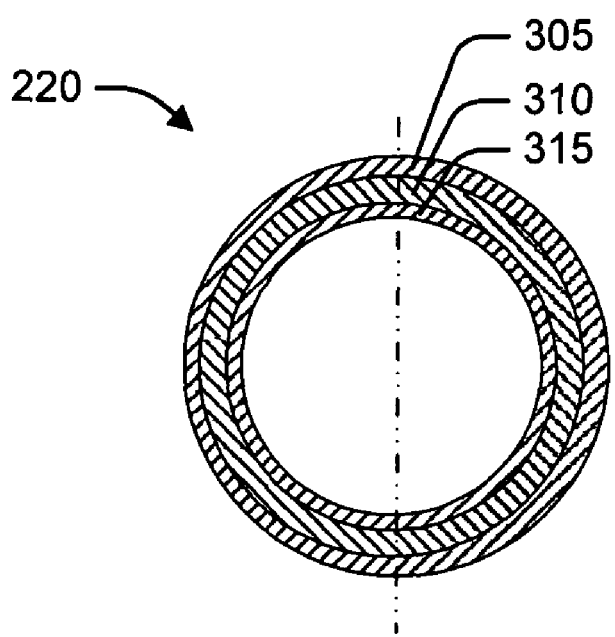

An example mass 220 is shown in FIG. 3. Mass 220 has a ring configuration with an outer rim to fit within the housing formed by the inner sleeve 210 and the outer sleeve 215. The mass 220 includes interruptions to segment the outer rim of the mass 220 into sections 305, 310, and 315. The mass, stiffness, and dimensions of the sections may be adjusted to the change the resonant frequency of the mass 220.

A cut-away view of mass 220 is shown in FIG. 4 illustrating the varying dimensions of the sections 305, 310, and 315. Although the outer rim of the mass 220 is shown with three sections, it may have more or less, based on the needs of the acoustic attenuator 170. The mass 200 also may include a race 405 to engage an O-ring 250, as shown in FIG. 2.

A cut-away view of mass 235 is shown in FIG. 5. The mass 235 includes sections 505, 510, and 515 with different dimensions, based on the needs of the acoustic attenuator 170. The mass 235 includes a race 520 that faces the inner sleeve 205 to engage an O-ring 250, as shown in FIG. 2.

Figure 6:
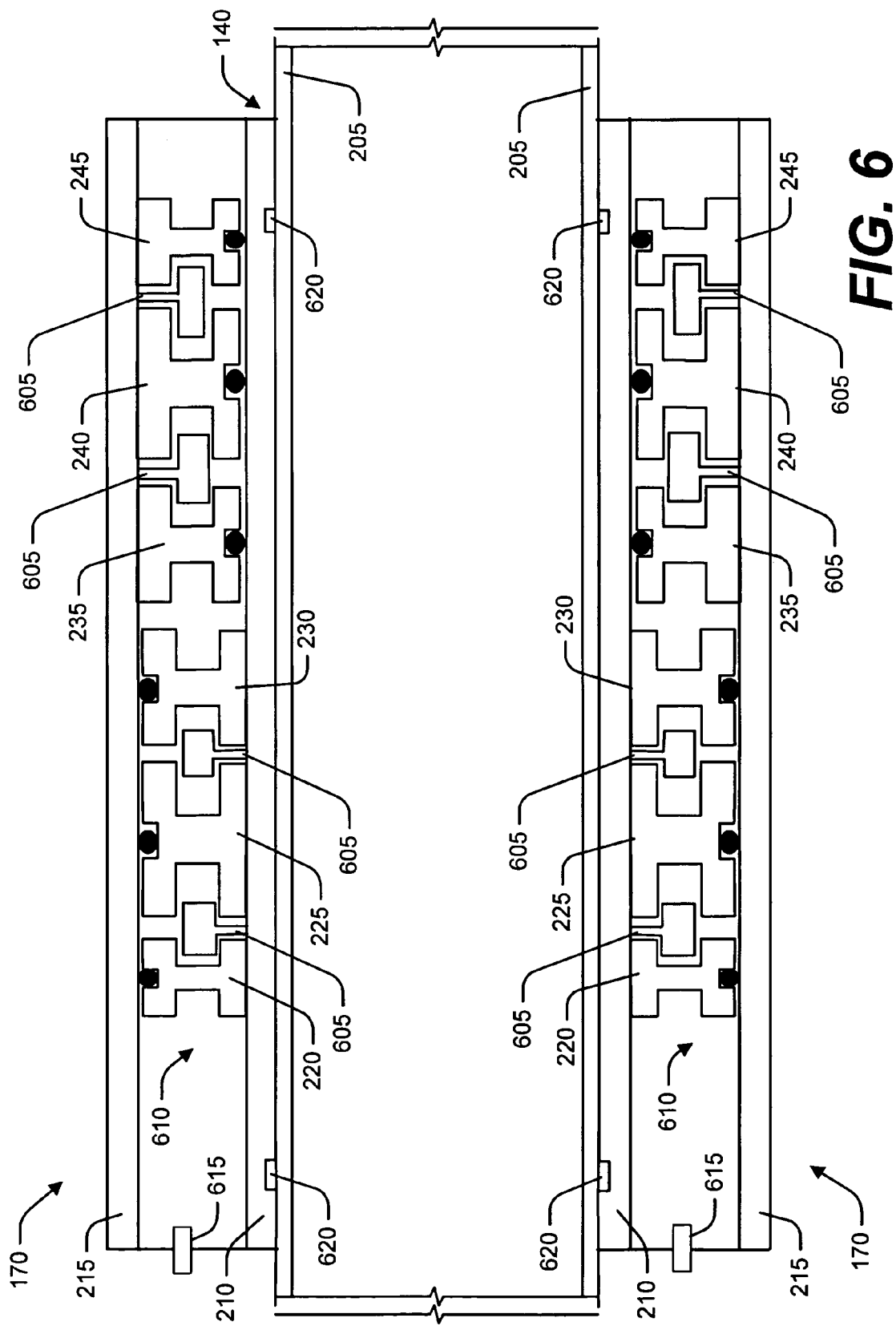
FIG. 6 illustrates a portion of the drillstring with an acoustic attenuator attached.

Another example acoustic attenuator 170 is shown in FIG. 6. The acoustic attenuator includes one or more vibration dampeners 605 between masses, such as masses 220 and 225. The vibration dampeners 605 may include any material to dampen vibrations in the masses. The vibration dampeners 605 may also help to prevent the masses from mechanically degrading and failing due to excessive vibration. Some example vibration dampeners 605 include an electrometric compound. Example vibration dampeners 605 may include spring materials, such as rubber.

In addition to the vibration dampeners 605, the acoustic attenuator 170 may also include a viscous fluid 610 within the acoustic attenuator 170. The viscous fluid 610 dampens the vibrations of the masses by presenting a resistance to motion. The viscous fluid 610 may also help to couple the masses to the inner sleeve 210 or the outer sleeve 215. The viscous fluid 610 may include any fluid, including air, oil based compounds, water based compounds, or silicon based compounds that provide a proper viscosity under operating conditions (e.g., downhole while drilling). In some implementations, the viscosity of the viscous liquid may need to be lower if the masses are closer together, and higher if the masses are further apart. The viscous fluid may have other properties, including, for example, low compressibility and non-conductivity. In certain implementations where the acoustic attenuator is packaged in, for example, the drill collar 145, the viscous fluid may be a lubricant to lubricate other elements in the oil well drilling equipment 100. One example viscous fluid 610 may include silicon or another fluid with a very high viscosity (e.g., greater than 10,000 centistokes).

The acoustic attenuator 140 may also include one or more pressure stabilizers 615. The pressure stabilizer 615 may include any device to change the pressure within the acoustic attenuator 170 relative to the pressure outside of the acoustic attenuator 170. One example pressure stabilizer 615 includes a piston to equalize the pressure inside and outside of the acoustic attenuator 170 without allowing the viscous fluid 610 to escape from the acoustic attenuator 170.

The acoustic attenuator housing, formed by inner sleeve 210 and outer sleeve 215 may include one or more grooves, such as groove 620. The groove 620 may be filled with an acoustic dampening material to dampen acoustic waves in the drillpipe 140. Other dampening materials may include a rubber matrix with one or more high density materials (e.g., tungsten) in the matrix.

Figure 7:
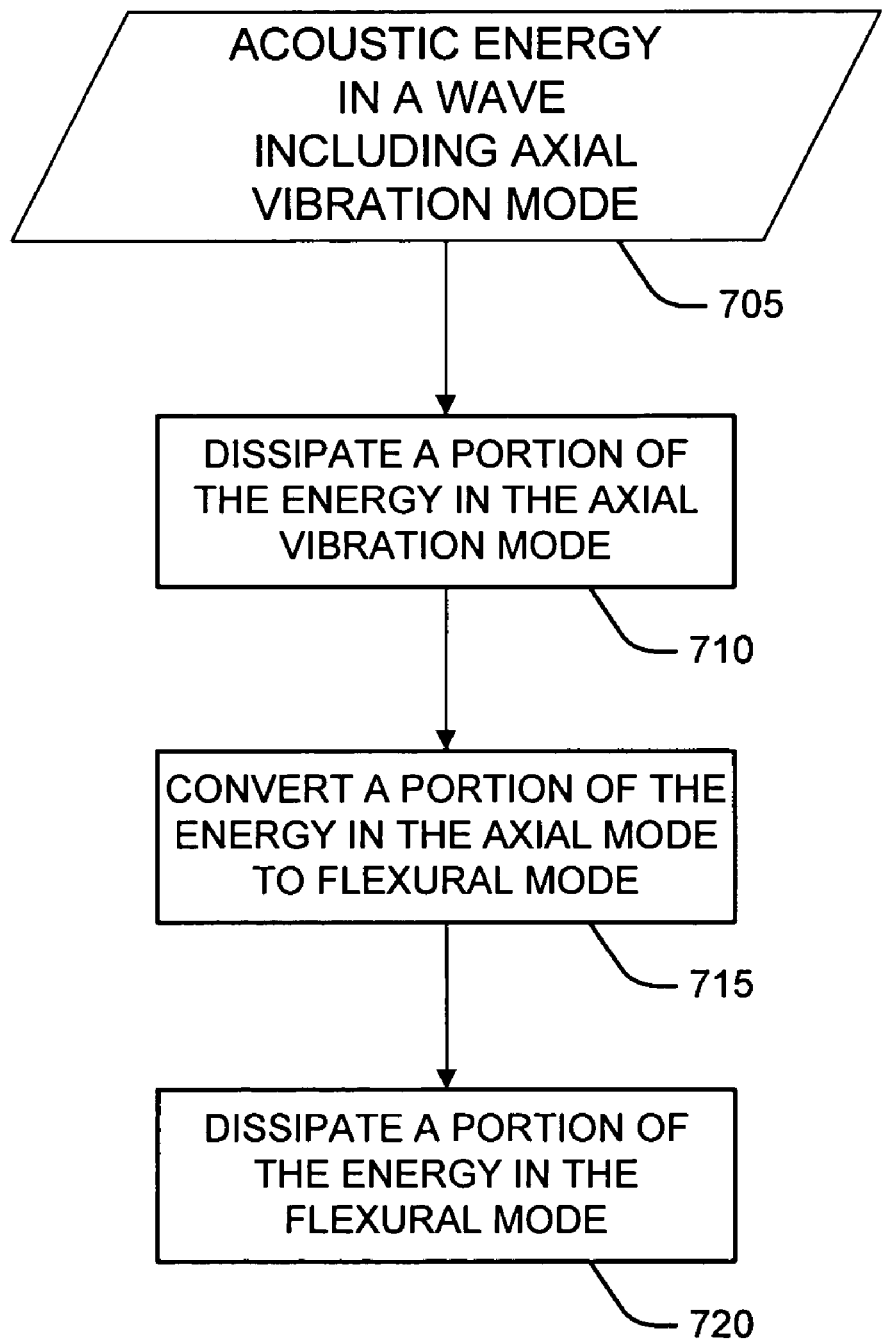
FIG. 7 shows a flow chart of a method for acoustic attenuation.

A flow chart illustrating the operation of the acoustic attenuator 170 is shown in FIG. 7. The acoustic attenuator 170 receives acoustic energy in a wave traveling along the drillpipe 140 (block 705). The acoustic wave includes an axial vibration mode relative to the drillpipe. The acoustic attenuator 170 dissipates a portion of the energy in the axial vibration mode (block 710). In one example acoustic attenuator 170, the acoustic dampening material in the groove 620 converts the acoustic energy into heat or another form of energy. The acoustic attenuator 170 then converts a portion of the energy that is in the axial mode to a flexural mode (block 715). In one example acoustic attenuator 170, the masses begin resonating when the acoustic energy is applied, converting a portion of the energy in the axial mode to the flexural mode. The system then dissipates a portion of the acoustic energy that has been converted to the flexural mode (block 720). In one example acoustic attenuator 170, the masses vibrate against vibration dampeners 605, viscous fluid 610, and rubber O-rings 250. Each of these presents an impedance to the vibration of the masses, dissipating a portion of the energy in the flexural mode.

The acoustic attenuator 170 may attenuate certain frequency components depending on its design and implementation. An example acoustic attenuator 170 may provide a 10 dB attenuation of a target frequency or range of frequencies.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. An attenuator to attach to a pipe of a drillstring, including: a housing including an inner sleeve and an outer sleeve; a first set of one or more masses and a second set of one or more masses, each between the inner and outer sleeves, to resonate when exposed to waves including acoustic frequency components; wherein the first set of one or more of the masses is not in mechanical contact with the outer sleeve, and includes an affixed edge in acoustic contact with the inner sleeve; wherein the second set of one or more of the masses is not in mechanical contact with the inner sleeve, and includes an affixed edge in acoustic contact with the outer sleeve.

2. The attenuator of claim 1, wherein the first set of one or more masses further include an unaffixed edge not in contact with the outer sleeve; wherein the second set of one or more masses further include an unaffixed edge not in contact with the inner sleeve; wherein one or more unaffixed edges include races to engage an edge dampener.

3. The attenuator of claim 2, where:
the edge dampener includes an O-ring.

4. The attenuator of claim 1, where: the first set of one or more of the masses is intimately connected to the inner sleeve.

5. The attenuator of claim 4, where: the first set of one or more of the masses is welded to the inner sleeve.

6. The attenuator of claim 1, where: the second set of one or more of the masses is intimately connected to the outer sleeve.

7. The attenuator of claim 6, where: the second set of one or more of the masses is welded to the outer sleeve.

8. The attenuator of claim 1, where:
the housing includes threading to engage the one or more masses.

9. The attenuator of claim 1, where:
the masses are expandable to contact the housing.

10. The attenuator of claim 9, where:
the masses are expandable by compressive force.

11. The attenuator of claim 1, where:
the inner sleeve, outer sleeve, and masses each expand at a rate of expansion when exposed to heat;
the masses have a higher rate of expansion than the outer sleeve; and
the masses have a lower rate of expansion than the inner sleeve.

12. The attenuator of claim 1, including:
one or more dampeners place between adjacent masses to dampen the vibrations of the masses.

13. The attenuator of claim 12, where:
one or more of the dampeners include an electrometric compound.

14. The attenuator of claim 1, including:
a viscous fluid in contact with one or more masses to dampen the vibrations of the masses.

15. The attenuator of claim 14, where:
the viscous fluid includes silicon.

16. The attenuator of claim 1, where:
the inner and outer sleeves are substantially cylindrical.

17. The attenuator of claim 1, where:
the housing includes a drill collar to engage the pipe.

18. The attenuator of claim 17, where:
the drill collar includes an inner diameter and an outer diameter; and
where the inner diameter includes one or more grooves.

19. The attenuator of claim 18, where
one or more of the grooves are filled with an acoustic dampening material.

20. The attenuator of claim 19, where
the acoustic dampening material includes rubber and tungsten.

21. The attenuator of claim 1, including:
a pressure equalizer to substantially equalize a pressure within the housing with a pressure outside the housing.

22. The attenuator of claim 21, where:
the pressure equalizer includes a piston.

23. The attenuator of claim 1, where the acoustic frequency components are characterized by a low frequency, wherein the low frequency is below 2 KHz.

24. The attenuator of claim 1, wherein the attenuator frequency response is from about 500 Hz to about 5 KHz.

25. The attenuator of claim 1, wherein the attenuator frequency response is from about 100 Hz to about 2 KHz.

26. The attenuator of claim 1, wherein the attenuator frequency response is from about 400 Hz to about 1.8 KHz.

27. The attenuator of claim 1, wherein the attenuator has a frequency response between 100 Hz and 5 KHz.

28. The attenuator of claim 1, wherein the attenuator converts a portion of energy in an axial vibration mode to a flexural mode when the one or more masses resonate.

29. A logging-while-drilling system including: a drillstring; one or more acoustic attenuators in contact with the drillstring to dampen acoustic waves traveling along the drillpipe, wherein one or more acoustic attenuators include: a housing including an inner sleeve and an outer sleeve; a first set of one or more masses and a second set of one or more masses, each between the inner and outer sleeves, to resonate when exposed to waves including acoustic frequency components; wherein the first set of one or more of the masses is not in mechanical contact with the outer sleeve, and includes an affixed edge in acoustic contact with the inner sleeve; wherein the second set of one or more of the masses is not in mechanical contact with the inner sleeve, and includes an affixed edge in acoustic contact with the outer sleeve.

30. The attenuator of claim 1, wherein the first set of one or more masses further include an unaffixed edge not in contact with the outer sleeve; wherein the second set of one or more masses further include an unaffixed edge not in contact with the inner sleeve; wherein one or more unaffixed edges include races to engage an edge dampener.

31. The logging-while-drilling system of claim 30, where: the edge dampener includes an O-ring.

32. The logging-while-drilling system of claim 29, where:
the housing include threading to engage the one or more masses.

33. The logging-while-drilling system of claim 29, where:
the masses are expandable to contact the housing.

34. The logging-while-drilling system of claim 33, where:
the masses are expandable by compressive force.

35. The logging-while-drilling system of claim 29, where:
the inner sleeve, outer sleeve, and masses each expand at a rate of expansion when exposed to heat;
the masses have a higher rate of expansion than the outer sleeve; and
the masses have a lower rate of expansion than the inner sleeve.

36. The logging-while-drilling system of claim 29, where one or more acoustic attenuators include:
one or more dampeners place between adjacent masses to dampen the vibrations of the masses.

37. The logging-while-drilling system of claim 36, where:
one or more of the dampeners include an electrometric compound.

38. The logging-while-drilling system of claim 29, where one or more acoustic attenuators include:
a viscous fluid in contact with one or more masses to dampen the vibrations of the masses.

39. The logging-while-drilling system of claim 38, where:
the viscous fluid includes silicon.

40. The logging-while-drilling system of claim 29, where:
the inner and outer sleeves are substantially cylindrical.

41. The logging-while-drilling system of claim 29, where:
the housing includes a drill collar to engage the pipe.

42. The logging-while-drilling system of claim 41, where:
the drill collar includes an inner diameter and an outer diameter; and
where the inner diameter includes one or more grooves.

43. The logging-while-drilling system of claim 42, where
one or more of the grooves are filled with an acoustic dampening material.

44. The logging-while-drilling system of claim 43, where
the acoustic dampening material includes rubber and tungsten.

45. The logging-while-drilling system of claim 29, including:
a plurality of acoustic attenuators.

46. The logging-while-drilling system of claim 29, wherein the attenuator frequency response is from about 500 Hz to about 5 KHz.

47. The logging-while-drilling system of claim 29, wherein the attenuator frequency response is from about 100 Hz to about 2 KHz.

48. The logging-while-drilling system of claim 29, wherein the attenuator frequency response is from about 400 Hz to about 1.8 KHz.

49. The logging-while-drilling system of claim 29, wherein one or more acoustic attenuators has a frequency response between 100 Hz and 5 KHz.

50. The logging-while-drilling system of claim 29, wherein one or more acoustic attenuators convert a portion of energy in an axial vibration mode to a flexural mode when the one or more masses resonate.

51. A method of attenuating acoustic energy in a pipe, the acoustic energy traveling in waves that include an axial vibration mode, the method including: converting a portion of the acoustic energy in the axial vibration mode to a flexural mode comprising: providing an attenuator comprising: a housing including an inner sleeve and an outer sleeve; a first set of one or more masses and a second set of one or more masses, each between the inner and outer sleeves, to resonate when exposed to waves including acoustic frequency components; wherein the first set of one or more of the masses is not in mechanical contact with the outer sleeve, and includes an affixed edge in acoustic contact with the inner sleeve; wherein the second set of one or more of the masses is not in mechanical contact with the inner sleeve, and includes an affixed edge in acoustic contact with the outer sleeve.

52. The method of claim 51, including:
dissipating a portion of the energy in the flexural mode.

53. The method of claim 52, where one or more of the masses are disposed in a viscous fluid, and where dissipating a portion of the energy in the flexural mode includes:
allowing the masses to resonate within the viscous fluid.

54. The method of claim 51, including:
dissipating a portion of the energy in the axial vibration mode.

55. The method of claim 54, where dissipating a portion of the energy in the axial vibration mode includes:
coupling a drill collar to the pipe, where the drill collar includes an inner diameter and an outer diameter, and where the inner diameter includes one or more grooves;
disposing an acoustic dampening material within one or more grooves.

56. The method of claim 55, where:
the acoustic dampening material is in contact with the pipe and the housing.

57. The method of claim 51, where the acoustic frequency components are characterized by a low frequency, wherein the low frequency is below 2 kHz.

58. The method of claim 51, wherein the attenuator has a frequency response between 100 Hz and 5 KHz.

* * * * *